Oct. 15, 1963  R. A. NYQUIST ETAL  3,107,162
SHEET GLASS FORMING APPARATUS
Filed Nov. 5, 1959  5 Sheets-Sheet 1

INVENTORS
Roy A. Nyquist,
James P. Zellers, Jr. and
BY Curtis A. Mewbourne
Nobbe & Swope
ATTORNEYS

INVENTORS
Roy A. Nyquist,
James P. Zellers, Jr. and
Curtis A. Newborne
BY
Nobbe & Swope
ATTORNEYS United States Patent Office 3,107,162
Patented Oct. 15, 1963

3,107,162
SHEET GLASS FORMING APPARATUS
Roy A. Nyquist, Toledo, Ohio, James T. Zellers, Jr., Charleston, W. Va., and Curtis A. Mewbourne, Shreveport, La., assignors to Libbey-Owens-Ford Glass Company, Toledo, Ohio, a corporation of Ohio
Filed Nov. 5, 1959, Ser. No. 851,086
15 Claims. (Cl. 65—196)

The present invention relates broadly to the art of producing sheet glass and more particularly to an improved apparatus for maintaining a glass sheet at a substantially uniform width while it is being continuously formed.

While the apparatus of this invention is not limited to use with any particular system of producing sheet glass, it has been advantageously employed in connection with a continuous sheet glass drawing machine of the general type exemplified in Patent No. 2,267,604, granted December 23, 1941. In such type of drawing machine, which is generally referred to as the Colburn machine, a continuous sheet of glass is drawn upwardly from a pool of molten glass and then, while still in a semi-plastic condition, although substantially set in its final sheet form, is deflected into a horizontal plane about a suitable bending member and carried horizontally into and through an annealing lehr.

As is well known in the art, some means must be provided to maintain the width of the sheet while being drawn; otherwise it will gradually narrow down and eventually draw to a thread. In the operation of the type of machine disclosed in the above patent, it has been customary to use pairs of knurled rolls that are positioned to engage the opposite sides of the glass sheet at the marginal edges thereof and which are driven in a manner to maintain the sheet at an optimum width. The knurled rolls are usually located to engage the sheet edges slightly above the base or meniscus of the sheet as it is drawn upwardly.

An important object of the invention is to provide improved apparatus for supporting the knurled rolls at each marginal edge of the newly formed glass sheet in such a manner that the said rolls can be readily and conveniently moved into operative relation with respect to the sheet edges or out of such position for the purpose of repair or replacement.

Another object of the invention is to provide an improved width maintaining apparatus equipped with a pair of knurled rolls engaging the marginal edge of the glass sheet, embodying means for raising and lowering the pair of rolls, together with means for adjusting the rolls of each pair relative to one another and to the sheet being drawn to compensate for different operating conditions.

Another object of the invention is to provide an improved width maintaining apparatus of the above character including novel means for adjusting the position of the knurled rolls in a horizontal plane with reference to the glass sheet being drawn and also relative to the bending member about which the glass sheet is deflected into a substantially horizontal plane.

A further object of the invention is to provide, in an improved width maintaining apparatus of the above character, means for continuously driving the pair of knurled rolls at each side of the sheet at a speed commensurate with the speed at which the sheet is being drawn while continuously circulating a cooling fluid through the knurled rolls thereby preventing the overheating thereof and also exerting a cooling influence upon the edges of the glass sheet.

Other objects and advantages of the invention will become more apparent during the course of the following description when read in connection with the accompanying drawings.

In the drawings, wherein like numerals are employed to designate like parts throughout the same.

Although, as pointed out above, the apparatus of the present invention is not limited to use in connection with any one system of producing sheet glass, it is particularly well adapted to those systems wherein the glass sheet is continuously drawn upwardly from a pool of molten glass. For example, in FIG. 1 of the drawings, the numeral 20 designates the drawing chamber of a sheet glass machine and which is formed by side walls 21 and 22 and a roof 23; all being of suitable refractory and/or insulating materials. The lower area of the chamber 20 includes a working receptacle or draw-pot 24 in which a pool of molten glass 25 is confined. Conventionally, a continuous ribbon or sheet of glass 26 is drawn from this pool and in the use of so-called Colburn drawing machines, the glass ribbon or sheet is then deflected into the horizontal plane about a bending means, such as the bending roll 27, and conveyed through an annealing lehr.

To prevent narrowing of the sheet from a desired width or its gradual decrease to a thread formation, it has been customary to provide width maintaining apparatus at each side of the sheet, such as is generally designated by the numeral 28, each equipped with a pair of knurled rolls 29 and 30 (FIGS. 2 and 5) engaging the opposed surfaces of the glass sheet 26 along the opposite marginal edges thereof. The pair of rolls is preferably driven in the direction of the drawing movement of the glass sheet but at a relatively slower speed and, in functioning to maintain the width of the sheet, form knurled surfaces in the relatively heavier edge portions 31 of the sheet 26. Inasmuch as the width maintaining apparatus 28 at the opposite edges of the glass sheet, or at the opposite sides of the drawing machine chamber 20, are identical in construction and operation, only one such apparatus has been illustrated in the drawings and will be described in detail hereinafter.

As will hereinafter be more fully described, the width maintaining apparatus 28 includes inter-related elements which cooperate with one another to control the "working" angle of the knurl rolls 29 and 30 of each pair of rolls with reference to one another; the positioning of one roll of each pair of knurled rolls axially parallel with the surface of the upwardly drawn sheet the roll engages; the aligned relation of the pairs of rolls with the engaged sheet surface at the opposite edges thereof; the elevation of the rolls above the base or meniscus of the glass sheet; the inward or outward movement of the rolls to establish and maintain the width of the glass sheet betwen the marginal edges 31 that are engaged between the knurl rolls; and the angular relation of the pairs of rolls, when desired, with reference to a substantially horizontal plane. By means of such generally described elements, the relative positions of the opposed pairs of knurl rolls can be readily and accurately adjusted to the end that after initial installation corrections can be easily effected to improve the over-all quality of the sheet glass to be produced.

More particularly, each of the width maintaining apparatus 28 is bodily mounted on a structural support member 35 forming a component part of the framework of the drawing machine. As viewed in FIG. 1, it will be seen that the support or mounting members 35 are fixedly positioned adjacent to or on the outwardly directed surfaces of the side walls 36 enclosing the heating chamber 37 surrounding the draw-pot 24. Each mounting member 35 is provided with a wall 38 having a finished upper surface. In the wall 38 is provided an oval, vertically open chamber 39 having a major axis parallel with the longitudinal axis of the mounting member. The chamber 39 communicates with aligned slots 40 and 41 extending outwardly and located in the major axis of said chamber. Preferably the longitudinal axis of the mounting member and the axes of the chamber and slots are generally parallel to the adjacent side wall 36. The slots 40 and 41 open downwardly into elongated recesses 42 and 43.

Each of the width maintaining apparatus 28 includes a base member 45 and an adjustable roll supporting carriage, generally designated by the numeral 46, which is carried by the base member 45 and adjustably movable with reference thereto. The base mounting member 45 of the apparatus 28 is comprised of a base plate 47 and a central, vertically disposed column 48; the undersurface of the base plate 47 resting on the finished surface of wall 38 and the column 48 depending downwardly through the chamber 39. The base member 45 is adapted to be fixedly secured in its relation to the mounting member 35 by means of T head bolts 50 located in suitable openings provided in the opposite ends of the base plate 47. In the well-known manner, the heads 51 of the bolts are received in the recesses 42 and 43, the shanks 52 being passed through the slots 40 and 41 and the upwardly directed threaded ends being equipped with nuts 53 and spacers 54 underlying the nuts. When the nuts are tightened against the spacers 54, the shanks 52 are elevated to bring the heads 51 tightly against the under edges of the slots thereby rendering the base member 45 stationary in any desired position. Controlled adjustment of the base member 45 bodily with reference to the mounting member 35 constitutes one of the basic adjustments by which the proper positioning of the knurled rolls 29 and 30 is obtained. This adjustment is made transversely of the glass sheet.

Figures 4, 14, 15, 18:
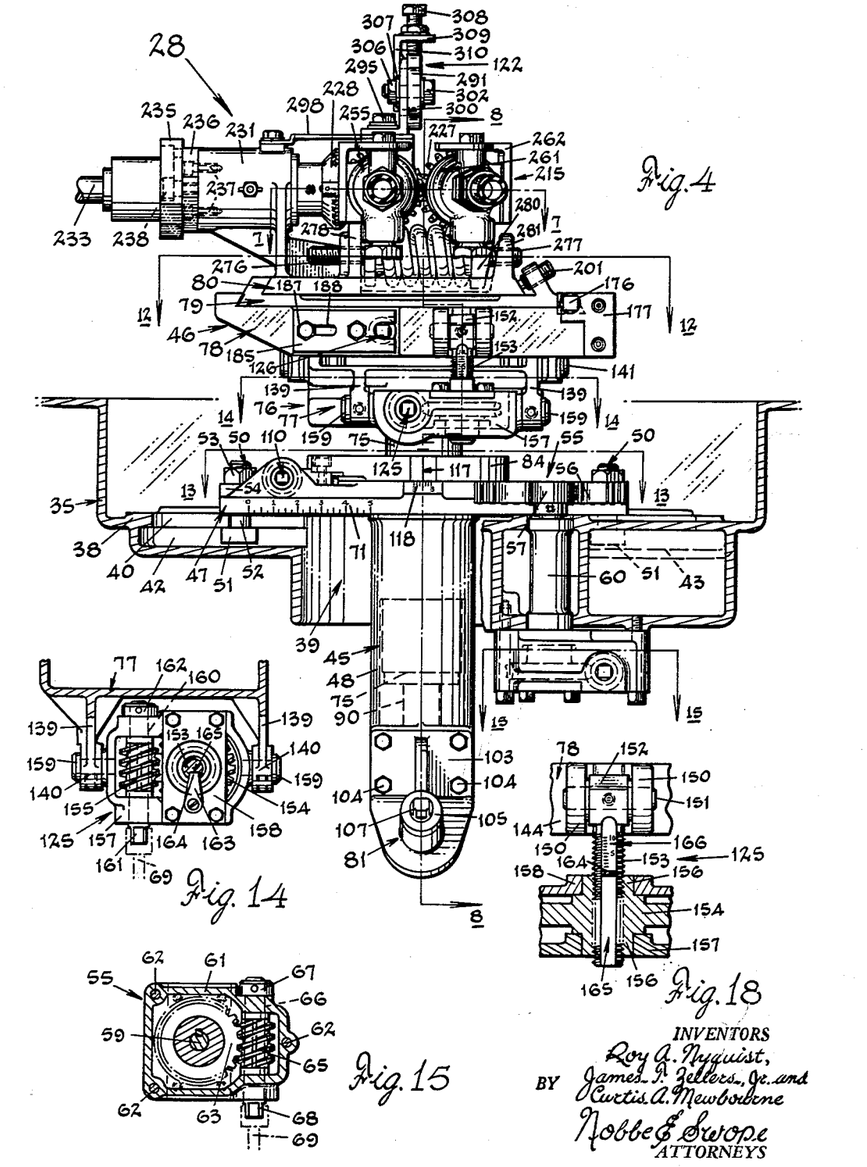
FIG. 4 is an end elevation of the apparatus.
FIG. 14 is a horizontal sectional view as taken on line 14—14 of FIG. 4.
FIG. 15 is a horizontal sectional view as taken on line 15—15 of FIG. 4.
FIG. 18 is a fragmentary detail view of an adjusting member.
Figure 13:
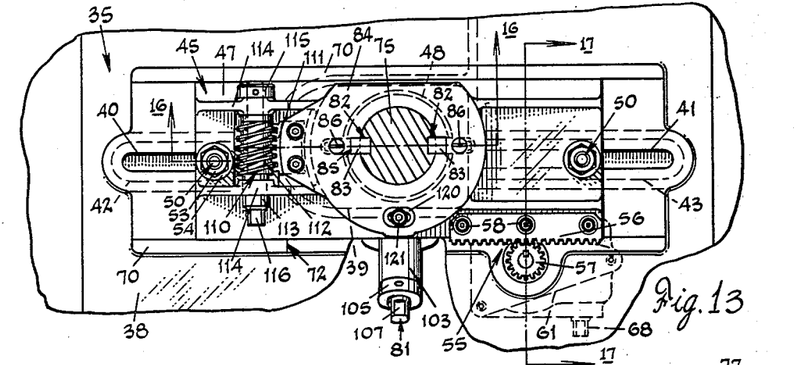
FIG. 13 is a horizontal sectional view as taken on line 13—13 of FIG. 4.
Figure 17:
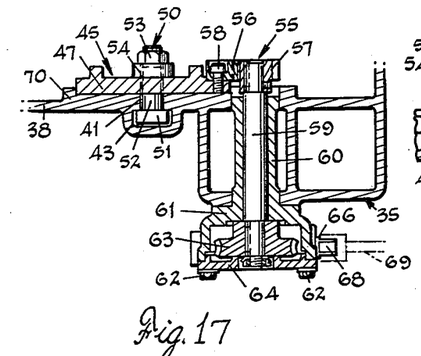
FIG. 17 is a vertical longitudinal sectional view as taken on line 17—17 of FIG. 13.

For this purpose, a gear drive generally designated by the numeral 55, as viewed in FIGS. 4 and 13, is operatively associated with he base plate 47 through a rack gear 56 and pinion gear 57. The rack gear 56 is fixedly mounted by bolts 58 on the upper surface of the base plate 47 along one edge and substantially at a corner thereof. The gear 57 is keyed to a vertically disposed shaft 59 journaled in the column 60 of a gear case 61 (FIGS. 4 and 17). The column 60 is fitted into a cored passageway in the support member 35 while the case 61 is secured by bolts 62 to the lower surface thereof.

Referring to FIGS. 15 and 17, the shaft 59 at its opposite or lower end fixedly mounts a worm gear 63 which is supported in the case 61 by means of an end plate 64. Worm gear 63 is operatively driven by a worm 65 keyed onto a shaft 66. The ends of the shaft 66, outwardly of the worm, are suitably journaled in the walls of the case 61; one end thereof being secured to limit longitudinal movement of the shaft 59 relative to the case 61 by means of a collar 67. The opposite end of the shaft, indicated by the numeral 68, is squared for convenience of attaching a suitable wrench or like tool 69 similar to the tool indicated in broken lines in FIG. 8. Accordingly, upon release of the nuts 53, rotation of the shaft 66 in the selected direction is transmitted through the worm 65, the worm gear 63 and gear 57 to the gear rack 56 thereby moving the base member 45 in a direction parallel to the side wall 36 of the furnace. The finished surface of the wall 38 is formed with upwardly directed walls 70 to form mechanical "ways" between which the plate 47 is moved. This movement of the base member is transverse to the glass sheet and enables alignment of one apparatus 28 on one side of the furnace with the oppositely disposed apparatus on the other side thereof. A scale 71 is provided on one facing edge of the base plate 47 and an index line or mark 72 is formed on the upper surface of an adjoining wall 70 (FIGS. 4 and 13).

The support carriage 46 for the knurl rolls 29 and 30 is bodily carried on the base member 45 so that various other adjustments thereto can be made while the same is fixedly secured to the structural member 35. This support structure (FIG. 8) includes a vertically disposed elevating spindle 75 fixedly carrying a platform 76 comprised of a base element 77 and a tiltable slide member 78, pivotally supported thereon; an intermediate slide plate 79 and a bearing platform 80. More particularly, the elevating spindle 75 is slidably contained within the column 48 and is vertically movable relative thereto by means of a gear drive, generally designated by the numeral 81. Likewise, the spindle 75 is adapted to be rotated within the column. The elevating action of the spindle, or of the carriage 46 generally, is reflected in the adjusted positioning of each pair of knurl rolls at the desired working elevation above the pool of molten glass while the rotation thereof results in the positioning of one roll of each pair axially parallel wth the surface of the sheet it engages.

Figure 16:
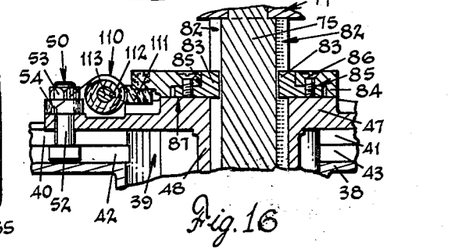
FIG. 16 is a vertical transverse sectional view as taken on line 16—16 of FIG. 13.

For these purposes, and as illustrated in FIGS. 13 and 16, the spindle 75 is formed with axially parallel keyways 82 in which are received keys 83 carried by a support plate 84. The keys 83 are fitted into diametrically opposed notches 85 formed in the gear plate and secured by screws 86. The support plate 84 is also movably supported on the finished upper surface 87 of the base plate 47 in a manner hereinafter disclosed.

Figures 8, 9, 10, 11, 19:
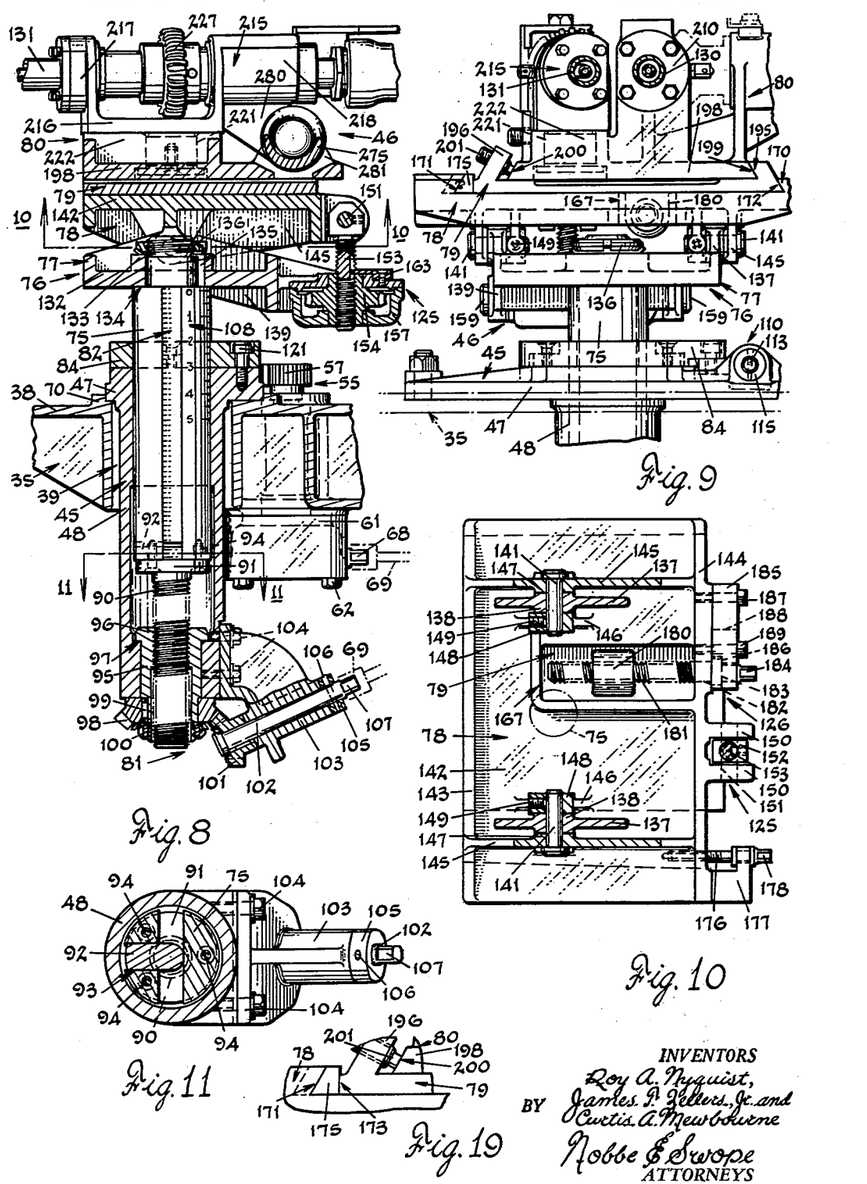
FIG. 8 is a vertical longitudinal sectional view as taken on line 8—8 of FIG. 4.
FIG. 9 is a fragmentary end elevation of the apparatus when viewed oppositely to the elevation of FIG. 4.
FIG. 10 is a horizontal sectional view as taken on line 10—10 of FIG. 8.
FIG. 11 is a horizontal sectional view as taken on line 11—11 of FIG. 8.
FIG. 19 is a cross-sectional detail view of component parts of the apparatus.

Referring now to FIGS. 8 and 11, the elevating spindle 75 at its lower end is equipped with a threaded or screw shaft 90 having an upper flanged end or head 91. The head 91 is provided with a diametrically aligned lug 92 and the adjoining end of spindle 75 is formed with a notch 93 for receiving the same. When interjoined in this manner, the flanged head 91 is secured to the end of the spindle by means of screws 94. The screw threads on the shaft 90 are engaged with internal threads of a bushing 95 provided with a flanged upper end 96 bearing on a surface 97 formed near the lower end of the column 48. The lower end of bushing 95 is equipped to carry a bevel gear 98 which is a component of the above-mentioned gear drive 81. The united rotation of the bushing and gear is obtained through a key 99 located in a keyway provided in the wall of the bushing. To suitably secure the gear 98 to the bushing 95 and to restrain the bushing from endwise movement, the lower end of the bushing is reduced in diameter and threaded to accommodate a locknut 100. The bevel gear 98 is meshed with a second bevel gear 101.

The gear is keyed to one end of a shaft 102 that is journaled in a bracket 103, which bracket is mounted by screws 104 on a flat, machined surface provided on the outer surface of the column 48. A retaining collar 105 is fixedly mounted on the shaft 102 by pin 106 near the end opposite the gear 101 and acts to prevent endwise motion of the shaft. The outer end of this shaft, similarly to shaft 66, is provided with a squared portion 107 for engagement by a wrench or tool 69.

Accordingly upon rotation of the shaft 102, the bevel gear 101 will rotate bevel gear 98 and the bushing 95. This rotation of the bushing will advance the screw shaft 90 in one direction or the other, i.e. upwardly or downwardly; however, the keys 83 and associated keyways 82 prevent rotation of the spindle 75 and restrict it to a vertical movement. A lineal scale 108 is provided on the surface of said spindle (FIG. 8), the lined indication, in registery with the top surface of the support plate 84, indicating the elevation of the spindle 75 and the support carriage 46. This serves as a reference in vertically aligning the pairs of rolls 29 and 30 on opposite sides of the sheet.

To angularly adjust the position of the support carriage 46 relative to the base member 45, the support plate 84 is adapted to be rotatably shifted on the finished surface 87 of the base plate 47 by means of a gear drive, generally designated by the numeral 110 (FIGS. 9 and 16). For this purpose, the plate 84 is equipped with a gear sector or arcuate rack gear 111 which with a worm 112 comprises the drive 110. The worm 112 is keyed to a shaft 113 journaled in vertically disposed integral ears 114 of the base plate 47. The shaft 113 at one of its ends is provided with a lock collar 115 while its opposite end is formed with a tool engageable squared portion 116. The adjusting rotation of the elevating spindle 75 is usually within the increments of a very small angle and to indicate the extent of this pivotal movement of the spindle, the plate 84 is provided with an index line 117, which is moved into registration, upon rotation of said plate, with suitable legends 118 on the adjoining edge surface of the base plate 47 (FIG. 4). To secure the gear plate 84 in an adjusted position, the same is provided with an arcuate slot 120 through which a locking screw 121 is passed and threaded into the base plate.

Generally stated, vertical movement of the spindle 75 or the support carriage 46 brings about the location of the pair of knurl rolls 29 and 30 at the desired elevation above the base or meniscus of the glass sheet. The above-mentioned elevation of the knurl rolls is to some extent determined by the additional use of a so-called "fork" member 122 that may be interposed between the level of the pool of molten glass 25 and the said rolls. As conventionally employed, this fork member is adapted to reduce the thickness of the end areas of the glass at or in the meniscus thereof. The opposite side edges of the glass upon being received in the pass between the pairs of knurl rolls accordingly are thinner in cross-section which decreases the amount of glass drawn against the undersurfaces of the knurls and consequently gages the character of the edges 31. Additionally, the use of a fork member has been found to influence the temperature of the glass and cool the same before being engaged by the knurl rolls. On the other hand, when the knurl rolls are employed without the accompanying use of fork members, their elevation may be determined by the amount of cooling that will be obtained in the end areas of the upwardly moving sheet due to the upward taper of the meniscus formation as well as the temperature of the atmosphere maintained above the molten pool.

Figures 5, 6, 7:
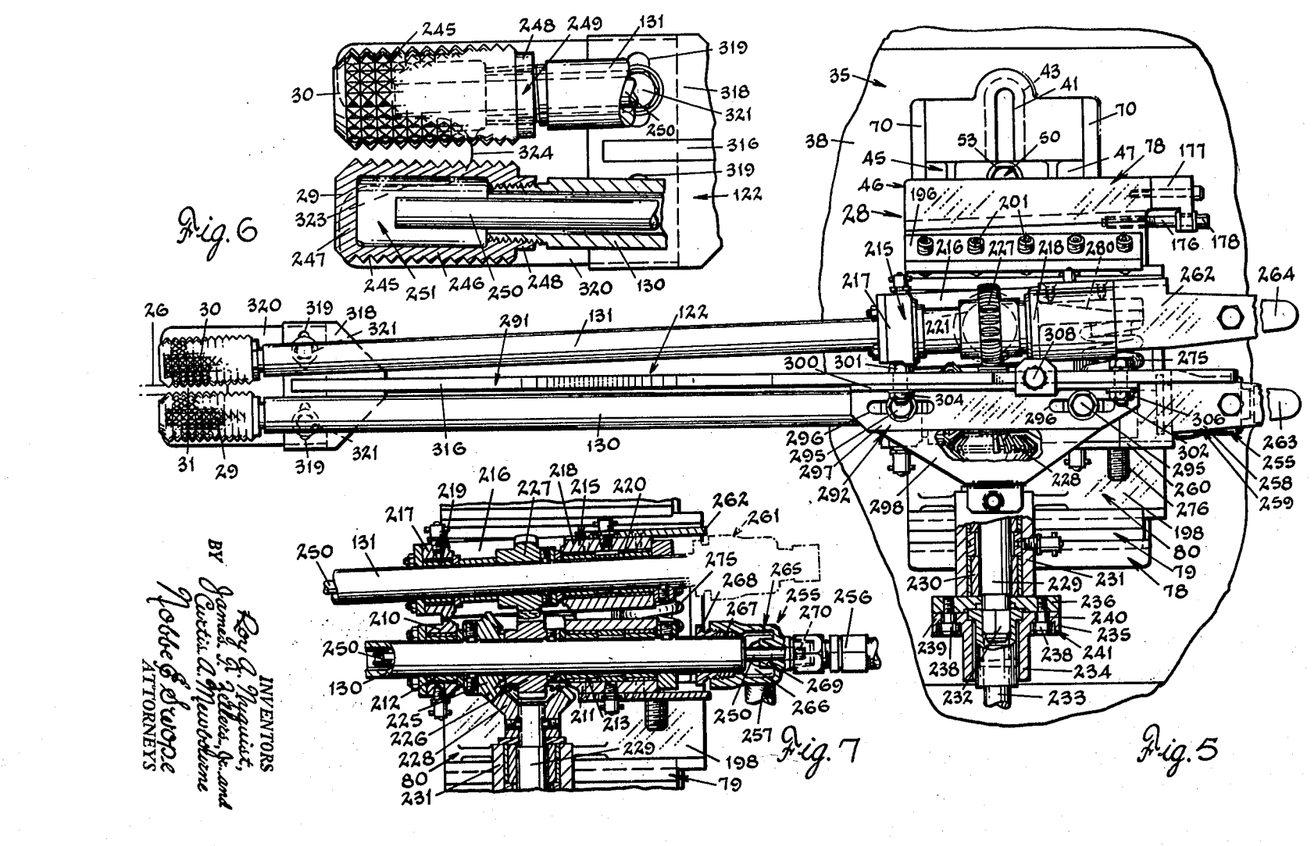
FIG. 5 is a plan view of the apparatus.
FIG. 6 is a horizontal cross-sectional view of the glass sheet engaging rolls at the inner end of the apparatus.
FIG. 7 is a horizontal sectional view as taken on line 7—7 of FIG. 4.

Pivotal movement of the carriage 46, as produced by the gear drive 110, positions one of the pair of rolls axially parallel at the desired angle with reference to the surface of the glass sheet 26 that it engages. As herein disclosed, and according to normal operating procedures, a vertical plane through the engaging surface of one knurl roll of each pair is vertically coincident with a vertical plane tangent to the peripheral surface of the bending member or roll 27 over which the sheet is deflected. Stated otherwise, the axis of the knurl roll 29, as illustrated in FIG. 5, will be axially parallel to one planular surface of the glass sheet while the axis of opposed roll 30 will be disposed at a slight angle thereof. This situation on the opposite side of the draw chamber is reversed as will hereinafter be more fully described.

As viewed in FIGS. 8, 9, 10 and 12, the operative association of the spindle 75, the platform 76, the intermediate slide plate 79 and the bearing platform 80 with one another is believed to be clearly shown. Essentially the above parts, forming the support carriage 46, are adapted to be raised and lowered by means of the elevating spindle and the gear drive 81 and also to be shifted angularly in a horizontal plane by the support plate 84 and its associated gear drive 110. Then, by the base member 77 and tiltable slide plate 78 of the platform 76, the intermediate slide plate 79 and bearing platform 80 are adapted to be shifted angularly in a vertical plane by means of a gear drive, generally designated by the numeral 125. Further, the slide plate 79 and the platform 80 can be moved laterally with reference to the platform 76 through the operation of a drive unit 126. As will be more fully hereinafter explained, the platform 80 is more or less fixedly mounted on the intermediate slide plate 79. The purpose for securing the platform 80 on the slide plate 79 is essentially to enable convenient installation as well as rapid and easy removal thereof for repair or replacement. And, while the association of the knurl rolls 29 and 30 to the carriage has hereinabove been more or less broadly described, the same are actively mounted on the platform 80 by means of tubular shafts 130 and 131; means being provided for operatively driving the same and for cooling the rolls to prevent the overheating thereof and while inducing a cooling effect on the edges 31 of the glass sheet.

More particularly, the base member 77 of the platform 76 is formed with a horizontally disposed table portion 132 having a downwardly directed hub 133 that is received on the upper end of the spindle 75; the end of the spindle being reduced in diameter to form a shoulder 134 upon which the platform 76 is bodily mounted. The spindle and hub 133 are equipped with aligned keyways to receive a key 135 and by means of a lock-nut 136 threaded onto the end of the spindle, the platform is substantially rigidly secured thereon. The table portion 132 of the platform 76 is also formed with vertically disposed ribs 137 (FIGS. 8 and 10) having enlarged bosses 138 in which aligned openings are provided. In addition, the platform 76 is provided with outwardly directed arms 139 having enlarged bosses 140 at their ends. The gear drive 125 is supported at the ends of the arms 139, as shown in FIG. 14.

Referring now to FIGS. 8 and 10, it will be seen that the base element 77 of the platform 76 supports the tiltable slide plate 78 by means of axles 141 and, more particularly, is formed to provide means whereby said slide plate can be tilted or pivoted in a vertical plane. Thus, the tiltable slide plate 78 is embodied in a substantially horizontally disposed table portion 142 having downwardly directed side walls 143 and 144 between which are arranged pairs of transversely disposed, downwardly directed ribs 145 and 146. The pairs of ribs are substantially equally spaced from the vertically disposed axis of the elevating spindle 75, as indicated in broken line in FIG. 10. As well, the opposed surfaces of the bosses 147 and 148 respectively of the ribs 145 and 146 are spaced to receive the bosses 138 of ribs 137 therebetween.

The axles 141 are mounted in aligned bores in bosses 147, 138 and 148 and secured from endwise movement by set-screws 149 threaded into the bosses 148. The bosses 138 are thus adapted to serve as trunnions on which the tiltable slide plate 78 can be adjustingly swung to locate the table 142 thereof in the desired angular relation to a horizontal plane. This angular adjustment is carried out by means of the gear drive 125. For this purpose, the side wall 144 of slide plate 78 is formed with spaced, outwardly directed ears 150 which are adapted to support an axle 151 on which the head 152 of a vertically disposed screw shaft 153 is carried. As viewed in FIGS. 8 and 14, it will be seen that the threaded shaft 153 is responsive to movement of the pivot gear drive 125 which includes a worm gear 154 and a worm 155 meshing therewith. The screw shaft 153 is threaded through the worm gear 154 and thus causes swinging movements of the slide plate 78 on the axles 141 according to the direction of the movement of the screw shaft upon operation of the worm 155.

More specifically, the worm gear 154 is provided with lower and upper hub portions 156 which are respectively journaled in the bottom wall of a gear case 157 and in a cap plate 158 secured to said case (FIG. 18). The case 157 is supported for pivotal motion with reference to the base member 77 of the platform 76 by means of axles 159 carried in the aligned bosses 140 (FIG. 14) of the above-described arms 139 of member 77. The worm gear 154 is axially internally threaded to receive the threaded shaft 153 therein (FIG. 18). The worm 155 is keyed on a horizontally disposed shaft 160 journaled in the walls of the case 157 and having a square end portion 161 projecting outside the case (FIG. 14). The opposite end of the shaft 160 is equipped with a lock collar 162 to prevent endwise movement thereof. During operation of the shaft 160 and worm 155, by a suitable tool 69, the ensuing rotation of the worm gear 154 results in the adjusting movement of the screw shaft 153; however, by means of a key plate 163 (FIG. 14) said shaft is restrained from other than vertically directed endwise motion. The key plate 163 is secured on the cap plate 158 and an end 164 thereof is received in a rectangular groove 165 formed in the shaft 153. While essentially serving to restrain the said shaft from undesired rotation, the end 164 of the key plate 163 also serves as an indicator whereby the legends of a scale 166, inscribed on the bottom surface of the groove 165 (FIG. 18), can be read to denote the extent of vertical movement of the shaft 153. Since this shaft is pivotally carried on the axle 151 in the integral ears 150 of the plate 78, this vertical motion of the shaft will be reflected in the angular tilting or pivotal movement of the plate 78 bodily about the axes of the horizontally disposed axles 141 and with reference to the component base member 77 of the platform 76. Therefore, the scale 166 is calibrated to be read in degrees so that the angular plane into which the plate 78 has been tilted can be determined thereby. The table portion 142 of the plate 78 is also formed with a rectangular slot 167.

Figure 12:
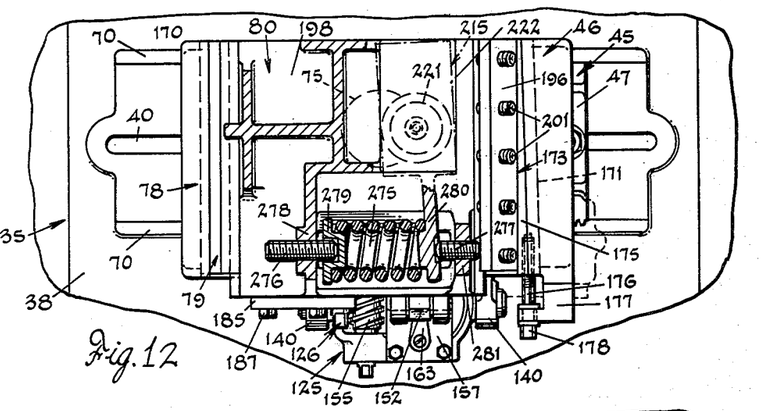
FIG. 12 is a horizontal sectional view as taken on line 12—12 of FIG. 4.

As shown in Figs. 8, 9 and 12, the tiltable slide plate 78 is adapted to support the intermediate slide plate 79; to directively guide the same during adjusting movements thereof and to then secure it from movement. For these purposes, the upper machined surface of the table portion 142 is finished to provide V-shaped, conventional guide ways 170 and 171 (Figs. 9, 12 and 19); the way 170 being parallel to the transverse axis of the plate 78 while the way 171 is formed at an angle thereto. The guide way 170 is thus adapted to receive the beveled side edge 172 of the intermediate plate 79 (Fig. 9). However, the opposite edge 173 of this plate is formed substantially vertical and in parallel with the edge 172. This is for the purpose of positioning a wedge bar or gib 175 between the vertical edge 173 and the adjoining V-shaped way 171 of the plate 78. Accordingly, the width of the intermediate plate 79 is narrower between the edges 172 and 173 than the distance between the guide ways 170 and 171 to the end that as the wedge bar 175 is urged forwardly, the surfaces thereof will engage the opposed surfaces of the edge 173 and the way 171 to secure the plate 79 in fixed relation to the plate 78. The bar 175 is adapted to be moved by means of a screw 176 rotatably mounted at its outer end in a bracket 177, attached to the wall 144 of the plate 78. The screw 176 is provided with a squared end 178 for wrench engagement.

The intermediate slide plate 79 is adapted to support the bearing platform 80 and to cause the same to move the pair of rolls inwardly or outwardly with respect to the edge of the sheet. And, while the platform 80 is releasably secured to the plate 79 in the manner described below, the intermediate slide plate 79 is adapted to be shifted relative to the tiltable slide plate 78 by means of the above-mentioned drive unit 126 (Fig. 10). Accordingly, the intermediate slide plate 79 is adapted to support the bearing platform 80 in substantially fixed relation and to move the same, when necessary, to predeterminedly establish and maintain the width of the glass sheet 26 as the edges 31 thereof are engaged by the knurl rolls 29 and 30. Usually the width of the engaged edges 31 is substantially equal to half of the length of the roll so that by determining the actual width of the sheet to be formed, the oppositely disposed pairs of knurls can be shifted inwardly or outwardly, i. e. with reference to the side walls of the draw pot 24, until the desired width of the edges 31 will be engaged between the knurl rolls as the glass sheet is drawn therebetween. This adjusting action is carried out by the shifting of the combined intermediate plate 79 and the platform 80 of each apparatus 28 with reference to the respective tiltable slide plate 78.

For this purpose, the undersurface of the slide plate 79 is provided with a downwardly directed lug 180 (FIG. 10) which is axially tapped, or otherwise formed with an internally threaded bore in which is received a horizontally disposed screw shaft 181 comprising the drive unit 126. The lug 180 is movably located in the slot 167 in the table portion 142 of the plate 78. As herein disclosed, the unthreaded shank 182 of the shaft 181 has an enlarged annular flange 183 and outwardly thereof is formed with a squared end portion 184. The flange 183 is located in a keeper plate 185 having a recess 186; said plate 185 being removably mounted on the wall 144 of the said plate 78. If desired, one screw 187, securing the keeper plate, is passed through a slot 188 therein (FIG. 4) whereupon removal of a second screw 189 will enable the keeper plate to be moved sidewise to release the flange 183 from the recess 186.

Upon engagement of the end 184 of the screw shaft 181, as by a suitable tool 69, and rotation of said shaft, the intermediate slide plate 79 will be adjustably shifted relative to its support association on the tiltable slide plate 78 which will of course effect the lateral positioning of the platform 80 and consequently the location of the knurls 29 and 30. The screw 176 may then be operated to urge the wedge bar 175 inwardly until the surfaces thereof are substantially rigidly engaged with the way 171 of the plate 78 and the opposed edge 173 of the plate 79.

The platform 80 is secured on the intermediate slide plate 79 in a manner to enable convenient initial mounting and adjustment and then for ready removal for ultimate repair of or replacement. This is of particular importance since the bearing platform 80 constitutes the actual supporting element for the shafts 130 and 131 of the knurl rolls 29 and 30 as well as for the driving and coolant sources therefor. Thus one side on the upper finished surface of the plate 79 is formed with a V-shape guide way 195, located in generally parallel relation to the guide way 170 of the plate 78, and with an angularly disposed wall 196 adjacent the edge 173. The base 198 of the platform 80 is substantially narrower than the distance between the way 195 and the wall 196 so that it is freely movable therebetween and removable therefrom. The base 198 is provided with beveled edge portions 199 and 200; the edge 199 being located in the way 195 while the edge 200 is adapted to be engaged by several set-screws 201, threadably mounted in the angularly disposed wall 196, to positively secure the platform from movement.

The bearing platform 80 essentially is formed of a metallic casting, having the above-described base 198 on which mounting means for the shafts 130 and 131 of the knurl rolls 29 and 30, respectively, are provided. The shafts 130 and 131, for purposes to be more fully hereinafter set forth, are of tubular cross-section. As viewed in FIGS. 4, 7, 8, 9 and 12, the base 198 is formed with upwardly directed bosses or brackets 210 and 211 having horizontally disposed and axially aligned bores equipped with sleeve bearings 212 and 213 in which the shaft 130 is rotatably mounted. Generally speaking, the axis of said shaft is disposed in a vertical plane that is parallel to but spaced from the vertical axial plane of the elevating spindle 75.

On the other hand, the shaft 131 is rotatably mounted in a U-shaped bracket 215, having a web or base 216 and upwardly directed end bosses 217 and 218 that are equipped with sleeve bearings 219 and 220. The undersurface of the base 216 is provided with an integral downwardly directed and axially disposed plug or spindle 221 which is rotatably fitted into the bore of a support block 222 integrally formed with base 198 of the carriage 80.

Figures 2, 3:
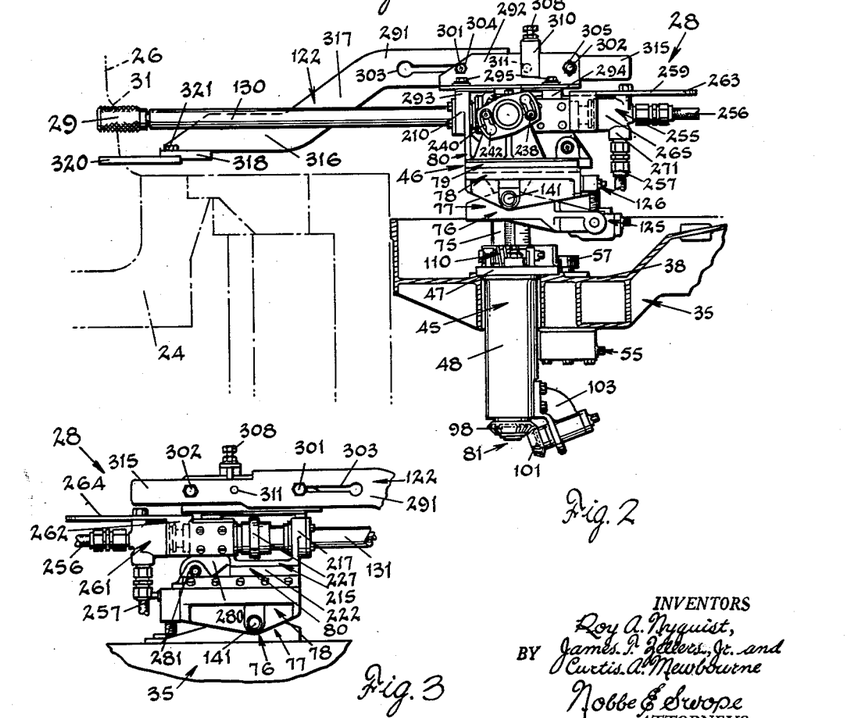
FIG. 2 is a side elevation of the width maintaining apparatus constructed in accordance with this invention.
FIG. 3 is an elevational view of the opposite side of the apparatus.

Between the bosses 210 and 211, the tubular shaft 130 fixedly carries a bevel gear 225 and a spur gear 226. The spur gear 226 is meshed with a spherical spur gear 227 on the tubular shaft 131 while the bevel gear 225 is similarly meshed with a bevel gear 228. The bevel gear 228 is keyed on the end of a shaft 229 that is axially disposed at substantially a right angle to the shaft 130 and journaled in the sleeve bearings 230 of a boss 231 integrally formed on the base 198. The shaft 229 is projected outwardly from the boss 231 and its outer end is formed with a square shank 232. The shank 232 is adapted to be operatively driven from a mechanical source of power by means of a universal shaft 233 having a flanged end socket 234 secured to the shank 232 thereof. The socket 234 is internally formed at one end to receive the squared shank 232 and this association between the driving and driven members is maintained by means of a retainer collar 235 (FIGS. 2, 4 and 5).

For this purpose, the retainer collar is formed with a counterbore in which the flanged portion of the end socket 234 is fitted. The collar 235 is removably mounted on the end of the boss 231 by means of a plate 236 secured to said boss by screws 237 and equipped in its diametrically located ends with screws 238. The collar has a flanged end portion 239 in which are provided arcuate slots 240 having rabbeted surfaces 241 and enlarged open end areas 242. Thus, when the end socket 234 is attached to the end of shaft 229, the flange 239 is arranged so as to receive the heads of screws 238 in the openings 242. The collar 235 is then axially turned until the said screw heads will be adapted to engage the rabbeted surfaces 241 when threaded inwardly of the plate 236. This enables the source of power through the shaft 233 to be readily attached to and likewise removed from the mounted shaft 229. Accordingly, the roll shafts 130 and 131 will be operatively rotated by the shaft 229 and through the above-described train of gears.

The knurl rolls 29 and 30, mounted on the inwardly extended ends of the shafts 130 and 131 respectively, and, as shown in FIG. 6, are generally provided with so-called "diamond" knurled peripheral surfaces 245 and are of a hollow construction having an annular wall 246, an end wall 247 and a shank portion 248. The shank 248 is internally threaded and provided with flatted areas 249 on the outer surface by which the knurl can be turned onto the threaded end of either shaft 130 or 131. Also, as will be seen in FIG. 6, a pipe 250 of small diameter terminates in the inner chambered area 251 of each knurl. The pipe 250 associated with each of the tubular shafts is adapted to supply a coolant fluid, such as water, in the chambers 251 while the coolant is withdrawn therefrom through the annular passageway between the pipes and the tubular shafts in a mannner to be more fully hereinafter set forth.

Outwardly from the boss 211, the opposite end of shaft 130 is associated with a coolant distributor casing 255 that is connected by a conduit 256 to a source of fresh coolant supply and by conduit 257 to a suitable sump. The casing 255 is supported on the horizontal leg 258 of an L-shaped bracket 259 which by the vertical leg 260 is mounted on the boss 211. In a like manner, the similar end of shaft 131 is provided with a coolant casing 261 which by an L-shaped bracket 262 is mounted on the boss 218 of bracket 215. In either event, the casings 255 and 261 are of the same construction and will be so described. Also, the horizontally disposed legs of the brackets 259 and 262 at their outer ends are shaped to serve as handles 263 and 264.

With reference to FIGS. 2 and 7, the body portion 265, of either of the coolant distributor casings 255 and 261, similarly is formed with a hollow chamber 266 which at one end is formed to contain a packing gland 267 by ring nut 268; said gland being thus positioned about the end of the respective tubular shaft. The opposite end or wall of the casing body 265 is formed with an inwardly directed boss 269 and an axially aligned outer boss 270 that is externally threaded. The bosses 269 and 270 are suitably drilled and tapped to receive the threaded end of the pipe 250 which is thereby in communication with the conduit 256 threaded onto the outer boss 270. A continuously fresh supply of coolant is thus directed through the pipe 250 to the chambered area 251 of each knurl roll and then returned by way of the respective tubular shaft to the chamber 266 of the casing 255 or 261. The chamber 266 is provided with a downwardly directed boss 271 (FIG. 2) having a passageway therein connecting to the conduit 257. This manner of supplying a coolant to the knurl rolls operates to constantly maintain the same at a uniform temperature and simultaneously exerts a cooling effect on the edges 31 of the sheet 26 as they are moved therebetween.

Now while the shaft 130 is maintained in fixed axial relation to the bearing platform 80 and in the sleeve bearings of the integral bosses 210 and 211, the shaft 131 is adapted to be pivotally adjusted to obtain the desired angle between the axes of the knurl rolls 29 and 30. This is for the purpose, as shown in FIG. 6, of suitably shaping the marginal edge 31 of the glass sheet 26 with a slight wedge or tapered cross-section that is thicker than the nominal thickness of the sheet as it is formed. The thicker and more rapidly cooled glass in these edges thus operates to establish the width of the sheet that is to be maintained as the sheet moves upwardly and is deflected about the bending roll 27.

This angular relation of the rolls 29 and 30 and more especially the shafts 130 and 131 is resiliently attained by means of a coil spring 275 that is generally interposed between the fixed boss or bracket 211 and the U-shaped bracket 215. As viewed in FIG. 12, the spring 275 is controlled in the application of its expansion characteristics by means fo oppositely disposed screws 276 and 277. The screw 276 is threadably positioned in a rib 278, depending from and integrally formed with the boss 211 and one end of said screw is received in a socketed spring washer 279. The opposite end of spring 275 is loosely carried by a centering lug formed on an arm 280 depending from the bracket 215. The screw 277 is threadably located in a vertically disposed ear 281 integrally formed with the base 198. The screw 277 is adapted to engage the opposite surface of the arm 280 to the end that as it is turned outwardly the increasing expansion of the spring will cause the arm 280 to "follow" therewith. This will cause the bracket 215 to rotate or swing about the spindle 221 seated in the block portion 222 of base 198 and thereby angularly swing the roll 30 into closer angular proximity to the roll 29. Inwardly directed movement of the screw 277 of course tends to swing the bracket 215 and the roll 30 in the opposite direction against the action of the spring. In any event, use of the screw 276 to threadably move the same in either direction will vary the expansion of the spring 275 and particularly entering movement of the screw will be reflected in the desired movement of the arm 280 while the desired expansion of the spring is maintained. It accordingly is believed apparent that the angular spaced relation to be established between the knurl rolls 29 and 30 can be accurately adjusted by the use of the screws 276 and 277 and the thus controlled expansion of the spring 275 therebetween.

The improved width maintaining apparatus of this invention also includes the provision of a fork member, heretofore generally designated by the numeral 122, which is adapted to reduce the thickness of the edges of the glass sheet as it rises from the level of the pool of molten glass 25 in the draw pot 24. The fork member is adjustably mounted in order that the glass engaging end thereof can be raised or lowered and likewise moved inwardly or outwardly with reference to the sides of the draw pot. For this purpose, the fork member 122 comprises an elongated bar 291 that is mounted by means of an L-shaped bracket 292 on bosses 210 and 211 of the carriage 80. As will be seen in FIGS. 2, 4 and 5, the bosses 210 and 211 are each additionally formed with upwardly directed lugs 293 and 294 which are suitably tapped to receive bolts 295. These bolts are passed through slots 296 in the horizontal leg 297 of the bracket 292. If desired, a plate 298 may be interposed, along one edge, between the lugs 293 and 294 and the leg 297 and secured at an opposite edge to the boss 231. The plate 298, as viewed in FIGS. 4 and 5, serves as a shield or guard for the gears 225, 226 and 228.

The bar 291 is adjustably mounted on the vertical leg 300 of the bracket 292 and adjacent the opposite ends thereof by bolts 301 and 302. The bolt 301 is inserted through a horizontally disposed slot 303 in the bar and registering hole in the leg 300 and threaded into a nut 304 fixedly secured to the opposite side of the leg. On the other hand, the bolt 302 is passed through a similar hole in the bar but is located in a vertical slot 305 in the vertical leg and threaded through a lock washer 306 into a nut 307. Between the bolts 301 and 302, the upper edge of the bar 291 is engaged by a set-screw 308 threadably carried in the horizontally disposed leg 309 of a post 310 integrally formed with the vertical leg 300 of the bracket 292. Also, to enable fixed mounting of the fork member in an inoperative position, as will hereinafter be more fully described, a bolt hole 311 (FIG. 3) is provided in bar 291 between the openings for the bolts 301 and 302.

Since the bar 291 at its outer end is above the axes of the shafts 130 and 131 while the inner end is located beneath the said axes, the bar is shaped with the outer end 315 and the inner end 316 in stepped and substantially parallel relation and interjoined by an angularly disposed integral medial portion 317. The end 316 is equipped with a horizontal bracket plate 318 having slots 319 formed therein. As shown in FIGS. 2 and 5, the actual glass engaging member 320 is adjustably secured to the bracket plate 318 by means of bolts 321 that are passed through the slots 319 and threaded into said engaging member or fork plate 320. The fork plate is provided with an inwardly directed notch 323 having a circularly shaped end surface 324. Upon loosening of bolts 321 the plate 320 may be shifted relative to the bracket 318 until the notch 323 is medially located beneath the pass between the knurl rolls 29 and 30.

With reference now to the drawings generally and to set forth the manner in which the width maintaining apparatus 28 is installed along the sides of the draw chamber 20 and in the respective mounting members 35, it will be recalled that each apparatus 28 includes a base member 45 and the adjustable roll supporting carriage 46. Thus the elevating spindle 75 of the supporting carriage 46 is slidably received in the column 48 of the base plate 47. One adjustment of each of the pairs of knurl rolls 29 and 30 or the height at which they are to be located above the surface of the molten glass pool 25, is obtained through operation of the gear drive 81 (FIG. 8) and movement of the spindle 75 vertically with respect to the column 48. The extent of this adjustment can be established or corrected in the apparatus 28 on each side of the draw chamber by means of the lineal scale 108 and the registration of a particular legend thereof with the upper surface of the gear plate 84.

Figure 1:
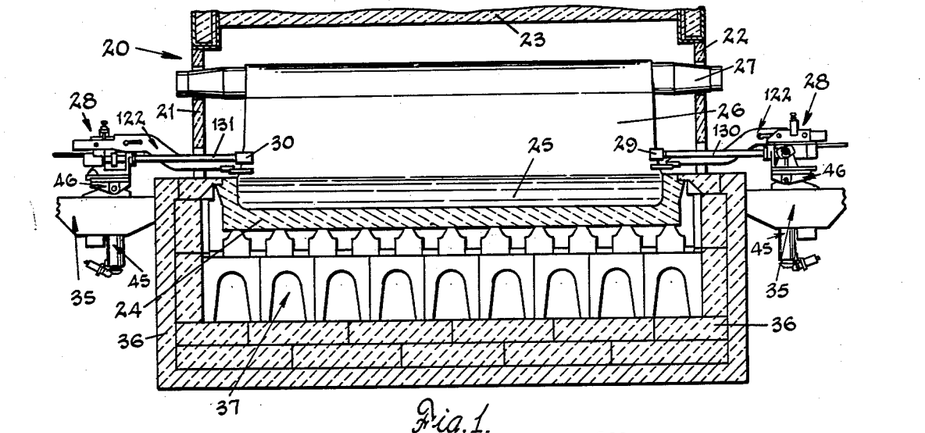
FIG. 1 is a vertical transverse cross-sectional view of a glass sheet drawing machine with which the width maintaining apparatus of the invention may be employed.

With reference now to FIGS. 1 and 5, it will be apparent that knurl roll 29 of the apparatus 28 illustrated at the left side of FIG. 1 engages the so-called "roll" surface of the glass sheet 26 since as the sheet is drawn upwardly and deflected over the bending roll 27, this surface will temporarily be in contact with the surface thereof. Likewise the roll 30 of the apparatus 28 at the right side of FIG. 1 will engage the glass sheet along this same "roll" surface. In actual practice it has been found advantageous for the edges of this surface to be substantially in a parallel plane with the major area or planular surface of the sheet. Accordingly when installing the apparatus, the axis of the roll, engaging the surface of the sheet, is adjusted to a line parallel to the said planular surface. For this purpose, the spindle 75 is shifted radially upon release of the support plate 84 from its securement by the locking screw 121. The gear drive 110, as shown in FIGS. 13 and 16, is then operated by a wrench 69 until the support carriage 46 has been rotated sufficiently to bring the particular knurl roll thereof into the desired axial alignment. As viewed in FIG. 5, this movement, in a clockwise direction, would adjust or correct the axial position of the roll 30, as illustrated therein, to a position of alignment for the apparatus at the right side of the draw chamber. Conversely, and as illustrated in FIG. 5, the roll 29 would be substantially axially aligned for the apparatus at the left side of FIG. 1.

Additionally, these particular knurl rolls of either pair are positioned so that the area of their surface, opposing the like surface of the mating roll, will be located substantially in a vertical plane tangential to the surface of the bending roll over which the sheet is deflected. This is accomplished by means of the gear drive 55, which as above described and shown in FIGS. 13 and 16, is adapted, through the gear 57 and rack 56, to shift the base plate 47 relative to the support member 35 when a wrench or like tool 69 is applied to the square end 68 of the shaft 66. The extent of this movement is denoted by registration of the legends of scale 71 with the index line 72.

Now with the pairs of knurl rolls 29 and 30 properly disposed with reference to their elevation above the pool of molten glass and the proximate roll of each pair aligned with the vertical plane tangential to the surface of the bending roll, the said pairs of rolls are moved inwardly or outwardly to establish the width of the glass sheet to be obtained as well as the width of the edges 31 of the glass sheet as it is drawn. This location of the knurls with reference to the sides of the draw pot 24 and in accordance with the actual width of the sheet to be maintained thereby is quite important. For example, if the pairs of rolls are advanced too much, the edges of the drawn sheet may become heavy with a tendency to sag. Also, the additional width of the edges 31 engaged by the rolls, increases the amount of knurled margins that must be eventually trimmed from the glass sheet after it has been annealed. On the other hand, when the pairs of knurls are not advanced a sufficient distance, an undesired condition may be created whereby engagement with the edges of the sheet is lost. To obtain the desired spacing between the opposed pairs of rolls, thereby establishing the total width of the sheet to be maintained and primarily the width of the knurled edges 31, the gib or wedge bar 175 is retracted to release the intermediate slide plate 79 from its fixed relation with the tiltable slide plate 78. This is accomplished by means of the screw 176 and with a tool 69 engaged at the square end 178 thereof. Upon rotation of the drive unit 126 or, more particularly, the screw shaft 181, the intermediate plate 79 will be moved relative to the tiltable plate 78 with the resultant shifting of the associated pair of rolls into the proper position for their operation. These operational adjustments, having been initially carried out, may of course be ultimately varied in order to meet different operating conditions.

In addition to the above-described adjustments which may be made to properly position the knurl rolls 29 and 30, it is also possible by means of the gear unit 125 to axially swing the same in a vertical plane thereby locating the rolls in tilted or angular relation to a horizontal plane. Such positioning may be found desirable when the forming glass sheet is to be slightly stretched or widened by the pull that will be exerted on the edges 31 while they are engaged between the pairs of rolls and drawn along lines inclined to a vertical plane. This is accomplished by the shaft 160 and through the worm 155 and gear 154 causing the screw shaft 153 to be moved downwardly with reference to the worm gear. Since the head 152 of the shaft is pivotally connected to the tiltable slide plate 78, said plate will be swung about the axes of the axles 141 until the required amount of angle is indicated on the scale 166 and with reference to the end 164 of the key plate 163. Any necessitated transverse adjustments may then be made by loosening the gib 175 and causing the intermediate slide plate to be shifted as the screw shaft 181 is operated.

The fork member 122 when employed with either of the pair of knurl rolls 29 and 30 is adapted to be adjusted in a vertical relationship therewith upon loosening of the bolts 295 thereby enabling the bracket 292 to be shifted with reference to the bracket carriage 80 generally. Similarly the desired angular position of the fork plate 320 is obtained by loosening of the bolts 302 at nut 307 and swinging the bar 291 about the axis of the bolt 301. Of course, in carrying out this adjustment the set-screw 308 is initially threaded outwardly and then inwardly until it has engaged the bar 291 in the position to which it has been swung.

In the event that use of the fork members 122 is to be temporarily dispensed with, the nut 307 is removed from the bolt 302 which is then withdrawn from the slot 305 in the bar 291. Upon loosening of the bolt 301, the bar is adapted to be moved outwardly until bolt hole 311 registers with the hole in which bolt 32 is normally positioned. This action will retract the fork plate 320 from its position beneath the respective pair of knurl rolls and to a position above the side walls 36 of the draw pot 24.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In sheet glass forming apparatus, wherein the sheet is continuously drawn upwardly from a pool of molten glass and then deflected over a bending member into a horizontal plane, a pair of width maintaining rolls engaging the opposite surfaces of the sheet at each edge thereof, a carriage upon which said pair of rolls is mounted, a base member supporting the carriage, a mounting member on which the base member is slidably mounted, means for moving the base member on said mounting member transversely of the glass sheet, means for moving said carriage vertically relative to the base member to elevate or lower said pair of rolls relative to the pool of molten glass, and means for driving the said pair of rolls.

2. In sheet glass forming apparatus as claimed in claim 1, wherein said base member comprises a base plate and a vertically disposed hollow column formed integral therewith, the said carriage being equipped with a spindle slidably received within the hollow column of the base member, and in which means is provided for moving the said carriage vertically relative to the base member.

3. In sheet glass forming apparatus as claimed in claim 2, wherein the last-named means includes an internally threaded bushing rotatably mounted within the hollow column and having a bevel gear fixed to one end thereof, a screw shaft connected to said spindle and threaded within said bushing, a driven gear meshing with said bevel gear, and means for restraining the screw shaft from rotary motion as the said bushing is rotated upon operation of the bevel gear.

4. In sheet glass forming apparatus as claimed in claim 3, wherein said screw shaft restraining means includes a support plate rotatably mounted on the base plate of said base member and having a central opening in which the spindle is received, means for releasably securing the support plate against movement with respect to the base plate, and a pair of key members fixedly mounted on the support plate and received in parallel keyways formed in the annular surface of said spindle whereby rotation of the said bushing will effect vertical axial movement of the screw shaft therethrough to raise or lower the carriage relative to the base member.

5. In sheet glass forming apparatus as claimed in claim 4, wherein the support plate has an arcuate gear sector mounted thereon, and further including a worm gear mounted on the base plate and meshing with the gear sector, and means for driving the worm gear to move the support plate with respect to the base plate whereby the pair of key members will turn the said spindle to radially swing the carriage relative to the base member.

6. In sheet glass forming apparatus as claimed in claim 1, including means for moving the carriage radially with respect to the base member to position at least one roll of said pair of rolls axially parallel with the surface of the glass sheet it engages as said sheet is drawn upwardly, and means for moving the pair of rolls with respect to said carriage to move said rolls inwardly or outwardly relative to the edge of the glass sheet.

7. In sheet glass forming apparatus as claimed in claim 6, including means for tilting the said pair of rolls relative to a substantially horizontal plane.

8. In sheet glass forming apparatus as claimed in claim 7, wherein said base member comprises a base plate and a vertically disposed hollow column formed integral therewith, the said carriage being equipped with a spindle slidably received within the hollow column of the base member, and means for moving the said carriage vertically relative to the base member and further, in which the means for moving the base member includes a gear rack mounted on the base plate, a spur gear meshing therewith and rotatably supported on the mounting member and in which means is provided for driving the spur gear to move the base member and carriage relative to the mounting member.

9. In sheet glass forming apparatus, wherein the sheet is continuously drawn upwardly from a pool of molten glass and then deflected over a bending member into a horizontal plane, a pair of width maintaining rolls engaging the opposite surfaces of the sheet at each edge thereof, a carriage upon which the pair of rolls is mounted, a mounting member, a base member for supporting the carriage on said mounting member and comprising a base plate and a vertically disposed hollow column formed integral therewith, means for moving the base member relative to the mounting member and transversely of the glass sheet, said carriage having a vertically disposed spindle at the lower end thereof slidably received in the hollow column of the base member, a platform fixedly mounted on the upper end of the spindle and comprising a base element and a slide plate pivotally mounted thereon for tilting movement about a substantailly horizontal axis, an intermediate plate carried by the tiltably mounted slide plate, a bearing platform secured to the intermediate plate and provided with horizontally spaced bearings, a tubular shaft mounted in each bearing and carrying at its outer end one of said rolls, means for moving the intermediate plate and bearing platform relative to said tiltable slide plate to adjust the operative position of the said pair of rolls with reference to an edge of the glass sheet, means for swinging the tiltably mounted slide plate relative to the base element of the first-named platform to adjustably position the platform and the pair of rolls thereon at an angle to a substantially horizontal plane, and means operatively associated with the spindle of the said carriage for swinging said carriage about a vertical axis.

10. In sheet glass forming apparatus as claimed in claim 9, wherein the means for moving the base member includes a gear rack mounted on said base member, a spur gear meshing therewith and rotatably supported on the mounting member and in which means is provided for driving the spur gear to move the base member and carriage.

11. In sheet glass forming apparatus as claimed in claim 9, wherein the bearing platform by one of the horizontally spaced bearings supports one of the pair of tubular roll shafts in fixed axial relation thereto, a bracket pivotally mounted on the bearing platform and including the second bearing to support the second of the tubular roll shafts, means for moving the pivotal bracket with respect to the bearing platform to locate the second roll shaft angularly with respect to the first roll shaft, and means driving said shafts to turn the said knurl rolls in opposite directions of rotation.

12. In sheet glass forming apparatus as claimed in claim 9, in which the means for moving the intermediate plate and bearing platform includes a downwardly directed and internally threaded lug formed integral with the intermediate plate, the tiltable slide plate having an opening for movement of the lug relative to said tiltable slide plate, a screw shaft supported on the tiltable slide plate and threaded into said lug, means for driving the screw shaft to move the intermediate plate with respect to the tiltable slide plate and in which means is provided for releasably securing said intermediate plate from movement.

13. In sheet glass forming apparatus as claimed in claim 9, in which the tiltable slide plate is mounted by horizontal axially aligned axles on the base element of the platform and the means for swinging the tiltable slide plate includes a screw shaft pivotally supported on said tiltable slide plate, the screw shaft having an axially parallel keyway formed therein, a gear case pivotally supported on the base element of the platform, an internally threaded worm gear rotatably mounted in the gear case and receiving the screw shaft therein, a key plate secured on the gear case and having an end portion received in the keyway of the screw shaft, and means is included for driving the worm gear to move the screw shaft therethrough in a line of movement parallel to said keyway whereby the tiltable slide plate will be angularly positioned with respect to the said base element.

14. In sheet glass forming apparatus as claimed in claim 9, in which the means for swinging the carriage includes a support plate mounted on the said base plate and having a circular opening for receiving the spindle of the carriage therein, the spindle of the carriage is provided with axially parallel keyways in the annular surface thereof, parallel key members secured to the support plate and positioned in the parallel keyways of said spindle, means releasably securing said support plate against movement relative to said base plate, and means on the base plate for moving said support plate when released from said securing means to turn the spindle through the keys mounted thereon.

15. In sheet glass forming apparatus as claimed in claim 14, wherein the support plate has an arcuate gear sector mounted thereon, and further including a worm gear mounted on the base plate and meshing with the gear sector, and means for driving the worm gear to move the support plate with respect to the base plate whereby the pair of key members will turn the said spindle to radially swing the carriage relative to the base member.

References Cited in the file of this patent

UNITED STATES PATENTS

| | | |
|---|---|---|
| 1,647,403 | Ferngren | Nov. 1, 1927 |
| 1,684,440 | Fraser | Sept. 18, 1928 |
| 1,731,249 | Mambourg | Oct. 15, 1929 |
| 1,739,959 | Ferngren | Dec. 17, 1929 |
| 1,827,459 | Conn | Oct. 13, 1931 |
| 1,848,099 | Allen et al. | Mar. 8, 1932 |
| 2,007,782 | Wildermuth | July 9, 1935 |
| 2,157,759 | Jollie | May 9, 1939 |